(12) United States Patent
Frisina

(10) Patent No.: US 7,252,336 B2
(45) Date of Patent: Aug. 7, 2007

(54) PIVOTABLE BOAT SEAT

(76) Inventor: Matthew Stephen Frisina, 66 Jacaranda Drive, Ballajura, Western Australia 6066 (AU)

(*) Notice: Subject to any disclaimer, the term of this patent is extended or adjusted under 35 U.S.C. 154(b) by 7 days.

(21) Appl. No.: 10/496,157

(22) PCT Filed: Nov. 5, 2002

(86) PCT No.: PCT/AU02/01497

§ 371 (c)(1),
(2), (4) Date: Nov. 5, 2004

(87) PCT Pub. No.: WO03/039945

PCT Pub. Date: May 15, 2003

(65) Prior Publication Data

US 2005/0062325 A1    Mar. 24, 2005

(30) Foreign Application Priority Data

Nov. 6, 2001 (AU) .................... PR8691

(51) Int. Cl.
A47C 1/032 (2006.01)
A47C 3/026 (2006.01)
A61G 15/00 (2006.01)

(52) U.S. Cl. .......... 297/340; 297/118; 297/130; 297/300.2; 297/313; 297/316; 297/325; 297/327; 297/328; 297/337; 297/354.12; 297/423.12

(58) Field of Classification Search .......... 297/1, 297/105, 111, 118, 130, 283.1, 283.2, 283.3, 297/316, 340, 341, 378.1, 378.12, 378.14, 297/354.11, 300.1, 300.2, 325, 423.11, 423.12, 297/DIG. 10, 337, 338, 313, 327, 328, 329

See application file for complete search history.

(56) References Cited

U.S. PATENT DOCUMENTS

| | | | | |
|---|---|---|---|---|
| 3,330,596 A | * | 7/1967 | Wells et al. | 297/130 X |
| 3,511,533 A | * | 5/1970 | Drabert | 297/337 |
| 4,198,094 A | * | 4/1980 | Bjerknes et al. | 297/328 X |
| 4,390,076 A | * | 6/1983 | Wier et al. | 297/330 X |
| 4,552,404 A | * | 11/1985 | Congleton | 297/330 |
| 4,614,378 A | * | 9/1986 | Picou | 297/118 X |
| 4,736,982 A | * | 4/1988 | Hwang | 297/118 |
| 4,793,655 A | * | 12/1988 | Kvalheim et al. | 297/118 X |
| 4,832,407 A | * | 5/1989 | Serber | 297/423.12 |
| 4,893,578 A | | 1/1990 | Doerfer et al. | |
| 4,934,303 A | | 6/1990 | Lathers et al. | |
| 5,048,893 A | * | 9/1991 | Cowan et al. | 297/329 |
| 5,054,857 A | * | 10/1991 | Kvalheim | 297/423.12 X |

(Continued)

FOREIGN PATENT DOCUMENTS

CH    675194 A  *  9/1990  .................. 297/338

(Continued)

Primary Examiner—Rodney B. White
(74) Attorney, Agent, or Firm—Gottlieb, Rackman & Reisman

(57) ABSTRACT

A seat (11) having a seat cushion (12) and a squab (16), the seat (11) being adjustable between a first configuration adapted to provide seating accommodation for a user and a second configuration adapted to provide leaning accommodation for a user, wherein in the second configuration, the squab (16) is positioned forwardly of its position in the first configuration and substantially above the forward most position of the seat cushion (12).

15 Claims, 3 Drawing Sheets

U.S. PATENT DOCUMENTS

| | | | |
|---|---|---|---|
| 5,149,174 A * | 9/1992 | Charash | 297/423.12 |
| 5,154,472 A * | 10/1992 | Kaufman | 297/316 X |
| 5,199,763 A * | 4/1993 | Wilder et al. | 297/330 X |
| 5,255,957 A * | 10/1993 | Opsvik et al. | 297/423.12 |
| 5,295,728 A * | 3/1994 | Schaevitz | 297/423.12 X |
| 5,338,094 A * | 8/1994 | Perry | 297/423.12 X |
| 5,346,280 A * | 9/1994 | Deumite | 297/330 |
| 5,463,972 A | 11/1995 | Gezari et al. | |
| 5,542,746 A * | 8/1996 | Bujaryn | 297/423.12 |
| 5,619,949 A | 4/1997 | Dick, Jr. | |
| 5,630,648 A * | 5/1997 | Allard et al. | 297/327 |
| 5,667,278 A * | 9/1997 | Li | 297/423.12 X |
| 5,857,747 A * | 1/1999 | Mundkowski | 297/423.11 |
| 6,109,694 A * | 8/2000 | Kurtz | 297/300.2 X |
| 6,120,097 A * | 9/2000 | Perry et al. | 297/325 |
| 6,431,649 B1 * | 8/2002 | Hensel | 297/300.2 |
| 6,554,353 B1 * | 4/2003 | Yu | 297/130 |
| 6,578,919 B2 * | 6/2003 | Seibold et al. | 297/340 X |
| 6,783,179 B2 * | 8/2004 | Komura et al. | 297/330 X |
| 6,824,149 B1 * | 11/2004 | Whitlock et al. | 297/118 X |
| 2003/0151288 A1 * | 8/2003 | Deisig | 297/313 |

FOREIGN PATENT DOCUMENTS

| | | | | |
|---|---|---|---|---|
| DE | 3400136 A1 * | 7/1985 | | 297/313 |
| DE | 3933815 A1 * | 4/1991 | | 297/330 |
| DE | 4306918 A1 * | 9/1994 | | 297/118 |
| EP | 179748 A2 * | 4/1986 | | 297/378.1 |
| GB | 2176396 A * | 12/1986 | | 297/423.12 |
| SU | 1384467 A | 3/1998 | | |
| WO | WO 8804903 A1 * | 7/1988 | | 297/118 |
| WO | WO 8906101 A1 * | 7/1989 | | 297/313 |
| WO | WO 9221270 A1 * | 12/1992 | | 297/118 |
| WO | WO 9401050 A1 * | 1/1994 | | 297/313 |

\* cited by examiner

PIVOTABLE BOAT SEAT

FIELD OF THE INVENTION

The present invention relates to seats where the user often leans against the seat rather than sits upon it. Such seats have common application in the field of aquatic vessels and the invention will hereinafter be described with reference to this application but the invention is by no means limited to this application.

BACKGROUND ART

Aquatic vessels of many types but especially small powerboats are frequently provided with a seat for the person navigating the boat. However, it is a well-known problem of such seats that they have limited use because the person driving the boat must often stared at the control wheel rather than sit in the seat. This is necessary because of the erratic motion of the boat especially when travelling at speed which requires the driver to adopt a more secure and responsive position than is usually provided by the seat. Other reasons why the driver must stand is that the foredeck is often of such a height relative to the seat that when seated, the driver has only limited visibility of the sea in front. While such seats may be used in the manner for which they were designed when the boat is travelling at slow speeds on calm water this may be opposite from the way the craft is usually manoeuvred.

It is also well known that, especially when the time spent standing is extensive, the driver will often find some support from the seat by leaning against it. While such support assists him, typical seats are not designed to provide any useful support in this way and are uncomfortable.

Within this specification, the term "cushion" in respect of a seat is used to denote the portion of the seat adapted to support the buttocks of a user of the seat. While commonly the cushion will incorporate some type of padding adapted to accommodate the buttocks comfortably, the term is intended to encompass supports for buttocks which are rigid such as the types often made from plastics material of metal.

The term "squab" is used to denote a portion of the seat adapted to support the back of the user and again may incorporate padding or may be of rigid construction.

DISCLOSURE OF THE INVENTION

Accordingly the present Invention resides In a seat comprising a seat cushion and a squab, the seat being adjustable between a first configuration, adapted to provide seating accommodation for a user, and a second configuration, adapted to provide leaning accommodation for a user, wherein, in the second configuration, the squab is positioned forwardly of the position occupies when the seat is in its first configuration and the loaning accommodation is adapted to be provided by both the squab and the seat cushion.

According to a preferred feature of the invention, the squab, when the seat is in its second configuration, is positioned substantially above the forward-most position of the seat cushion.

According to a preferred feature of the invention, the seat cushion is pivotally supported from a base structure for pivotal movement about a transverse axis, between a first position, which it is adapted to occupy when the seat is in its first configuration, and a second position, which it is adapted to occupy when the seat is in its second configuration.

According to a preferred feature of the invention, when the seat is in its second configuration, the seat cushion is positioned obliquely and the forward-most portion of the seat cushion is at a lower height than the rear-most portion of the seat cushion.

According to a preferred feature of the invention, a linkage is provided between the base structure, the seat cushion and the squab, whereby pivotal movement of the seat cushion between the first and second position is effected by corresponding movement of the squab.

According to a preferred embodiment, the linkage is in the form of a trapezoidal linkage.

According to a preferred embodiment, the linkage is in the form of a parallelogram linkage.

According to a preferred embodiment, the linkage comprises a set of arms rotatably engaged with the squab and engaging the cushion to permit relative movement between the cushion and the squab during the pivotal movement of the cushion between its first and second positions.

According to a preferred embodiment, each of the arms of the linkage is slidably received by a collar engaged with the cushion.

According to a preferred feature of the invention, a releasable looking mechanism is provided to retain the seat in at least one of the first configuration and the second configuration.

According to a preferred feature of the invention, the releasable locking mechanism is further adapted to retain the seat in at least one selected configuration intermediate the first configuration and the second configuration.

According to a preferred feature of the invention, the releasable locking mechanism is selectably engageable with the linkage.

According to a preferred embodiment, the releasable locking mechanism is associated with at least one of the collars.

According to a preferred embodiment, the releasable locking mechanism comprises at least one reciprocally-actuated pin adapted to engage the linkage through a respective collar.

According to a preferred embodiment, the locking mechanism comprises at least one rotatable member having an arm adapted to engage an aperture in the linkage.

The invention will be more fully understood in light of the description of two specific embodiments.

BRIEF DESCRIPTION OF THE DRAWINGS

The description is made with reference to the accompanying drawings of which.

DETAILED DESCRIPTION OF THE SPECIFIC EMBODIMENTS

The embodiments of the invention are directed to a seat adapted for use in a vessel such as a powerboat.

Figure 1:
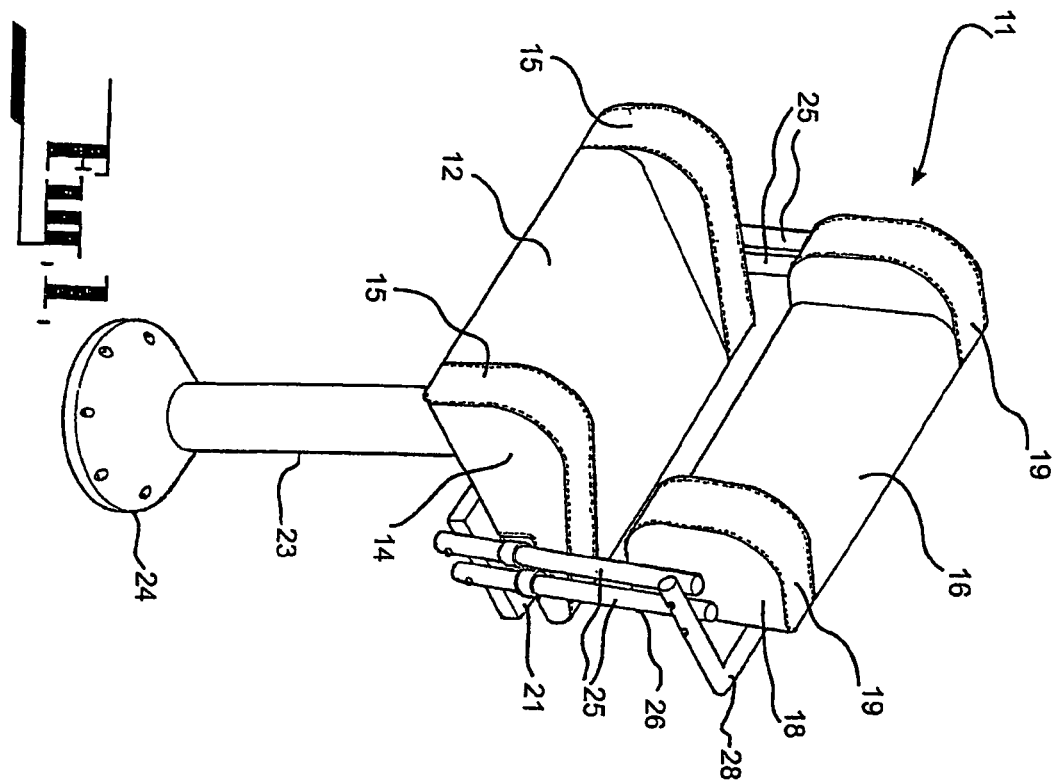
FIG. 1 is a front perspective view of a seat in accordance with the first embodiment showing the cushion and squab in a seating position.
Figure 2:
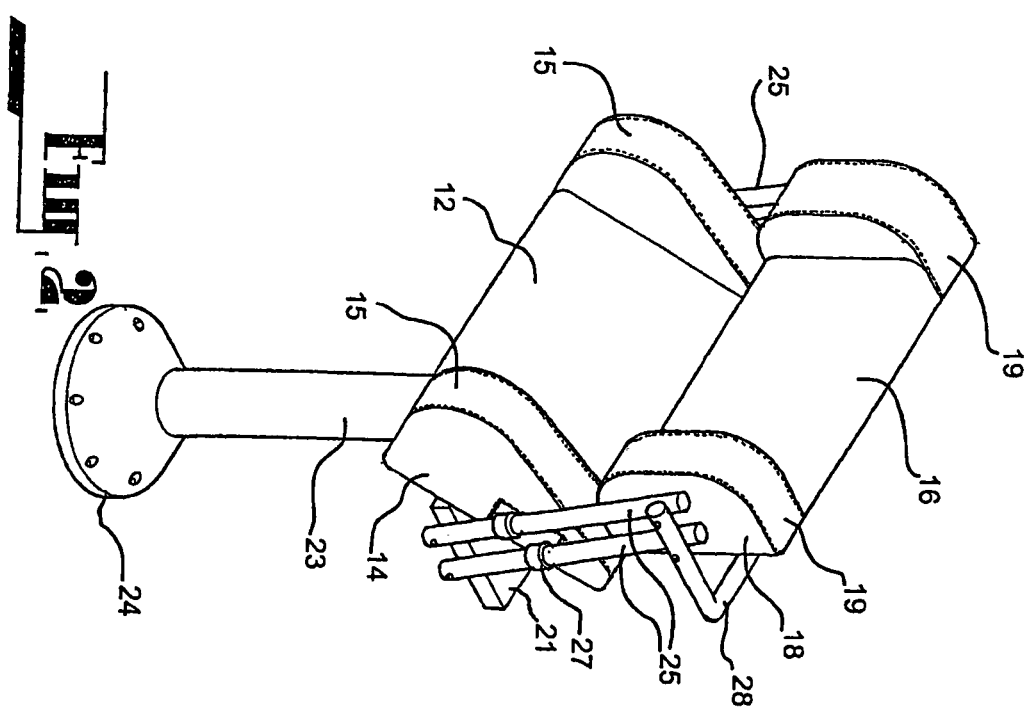
FIG. 2 is a front perspective view of a seat in accordance with the first embodiment showing the cushion and squab in a leaning position.
Figure 3:
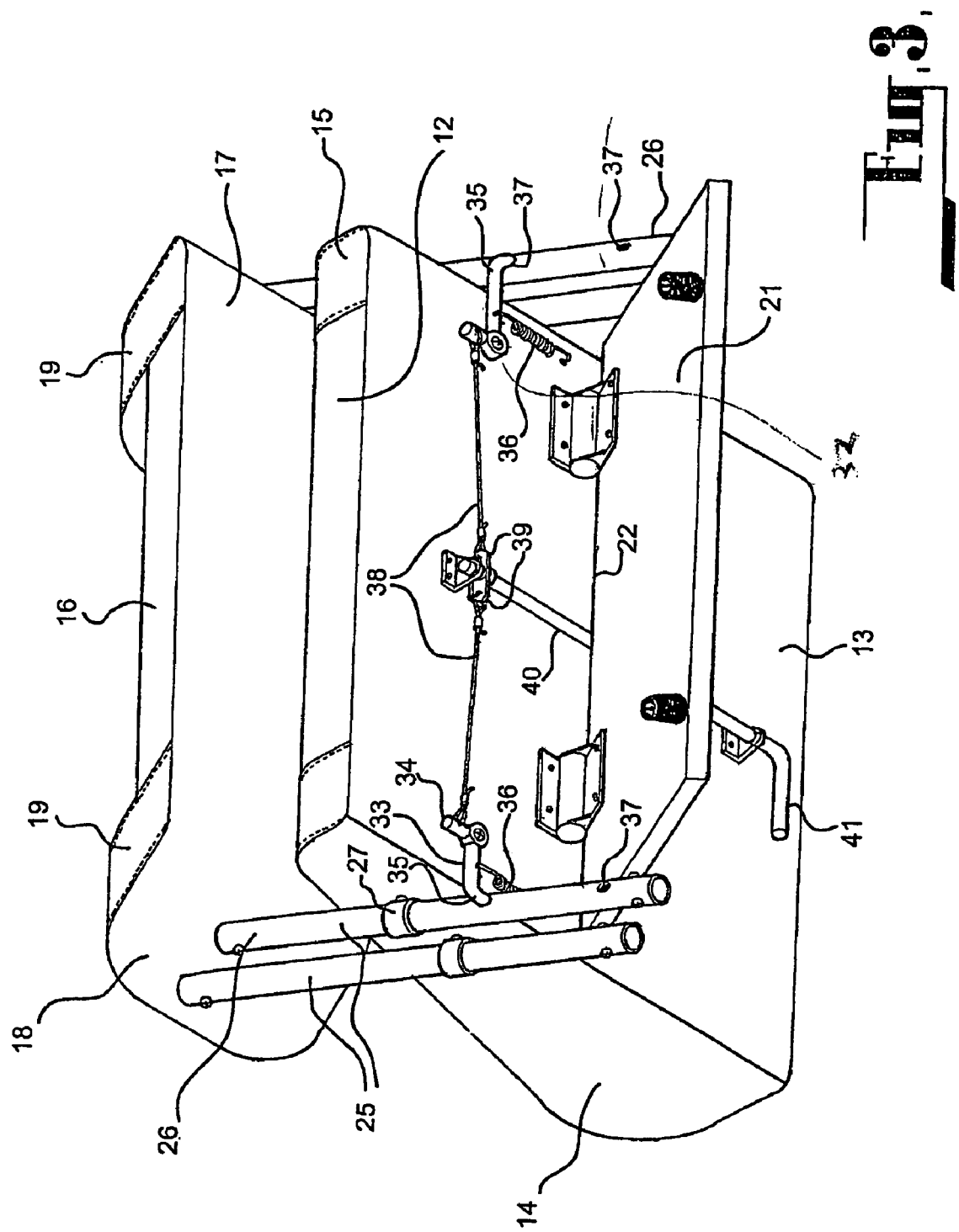
FIG. 3 is a rear perspective view of a seat in accordance with the first embodiment showing the cushion and squab in the leaning position.

The seat 11 according to the first embodiment, as shown in FIGS. 1, 2 and 3, comprises a cushion 12 and a squab 16 For convenience, the terms "upward", "downward", "forward" and "rearward", and variations thereof, will be used with reference to the seat as installed within the vessel, forward corresponding to the forwards direction of the vessel.

The cushion 12 is secured to a mounting plate 13 and is substantially of a form that is well known in the art. The sides 14 of the mounting plate 13 are upwardly formed to support an upwardly extending cushion-side-support member 15 at each side of the cushion 12 to provide lateral support to the user. In an adaption at the embodiment, the cushion 12 and cushion-side-support members 15 are integrally formed.

The squab 16 is also of substantially conventional form and supported by a back-plate 17. Each side 18 of the back-plate 17 extends forwardly to support a squab-side-support member 19 at each side of the squab 16 to provide lateral support to the user. Again in an adaption of the embodiment, the squab 16 and squab-side support members 19 are integrally formed.

The mounting plate 13 supporting the cushion 12 is mounted to a rectangular planar support plate 21, the front edge 22 of which is hingedly engaged with the underside of the mounting plate 13 intermediate the front and rear edges thereof to provide a rotational axis A-A of the planar support plate 21 relative to the mounting plate 13, the axis A-A being parallel to the front and rear edges of the mounting plate 13.

To support the seat, the rectangular planar plate 21 is secured to a first end of a pedestal 23, the opposed second end thereof being mounted to the vessel by means of a pedestal base 24. By virtue of the rotatable engagement of the mounting plate 13 to the planar support plate 21, the cushion 12 may be rotated between a substantially horizontal orientation suitable for seating of the user, to an oblique position suitable to support the user in a leaning position.

It should be noted that the embodiment may be easily adapted to mountings of a type other than that of a pedestal since the seat 11 itself is fully supported from the planar plate 21. Other means of mounting the planar plate 21 to the vessel will be suitable and thus the seat is easily adapted to the wide variety of configurations of vessels that are presently available on the market.

A pair of tubular members 25 is rotatably pinned to each side of the planar plate 21. Each tubular member slidingly engages a collar 27 rotatably secured to the upwardly extending side portion 14 of the mounting plate 13. The tubular members 25 are also rotatably pinned to the forwardly extending portion 18 of the back-plate 17 supporting the squab 16. The tubular members 25 of each pair of tubular members are parallel to each other and are pinned to the planar support plate 21 and the side portions 18 of the back-plate 17 so that the four-pinned points of each pair of tubes forms a parallelogram. As a result of the rotatable mounting of the tubular members 25 to both the sides of the planar plate 21 and the sides 18 of the back plate 17 supporting the squab 16, the squab 16 is able to move forwardly/rear-wardly relative to the planar plate 21 while being maintained in substantially the same vertical orientation. In alternative embodiments, the configuration of the four pinned points on each side may be made trapezoidal. By such configuration, the angular orientation of the squab 16 may be made to vary somewhat as it moves forwardly, according to the preferences of the designer.

At the same time, the sliding engagement of the tubular members 25 within the collars 27 attached to the side portions 14 of the mounting plate 13 supporting the cushion 12 provides a configuration whereby when the cushion 12 is rotated relative to planar plate 21, the tubular members 25 are also forced to rotate relative to the planar plate 21 thereby changing the configuration of the parallelogram so that the squab 16 is urged forward when the front of the cushion 12 is urged from a substantially horizontal position to an oblique position.

To assist the user to move the seat from the seating position to the leaning position, or back, a guide handle 28 is provided, supported by the pins which pin the tubular members to the side portion 18 of the back plate 17.

The seat is also provided with a leasable locking mechanism to lock the seat in at least the seating position and in the leaning position. According to the embodiment, the locking mechanism comprises a pair of locking members 32 rotatably mounted to the underside of the mounting plate 13. Each locking member 32 comprises a first rod 33 radially extending from the axis of rotation of the locking member 32 and a second rod 34 radially extending from the axis of rotation of the locking member 32, the second rod 34 being disposed at right angles to the first rod 33. At its end opposed to the axis of rotation, the first rod is formed with a circumferential element 35 adapted to engage a selected one of a plurality of apertures 37 formed in the rearward surface of the respective rearward tubular member 26. The locking member 32 is urged into looking engagement with the aperture 37 of the tubular member 26 by a spring 36 attached to the first radially extending rod 33 at one end and to the mounting plate 13 at its other end. Releasing force is applied to the locking member by means of a line 38 attached at one end to the second rod 34 and at the other end to a spigot 39 radially extending from a rotatable actuating member 40. The rotatable actuating member 40 is rotatably mounted to the mounting plate 13 and provided with a laterally extending handle 41 adjacent the front edge of the mounting plate 13 and is adapted to be actuated by the user.

Figure 4:
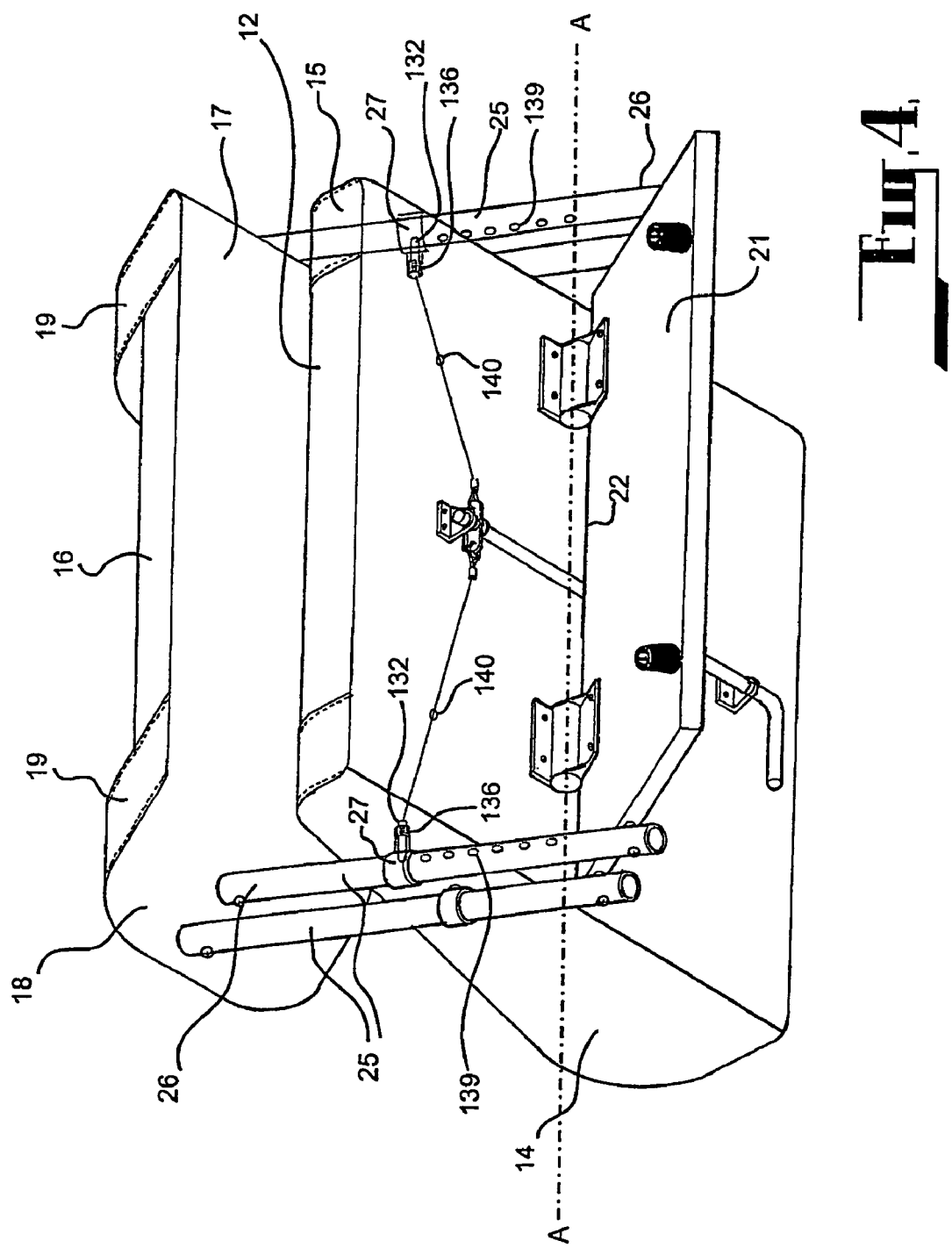
FIG. 4 is a rear perspective view of a seat in accordance with the second embodiment showing the cushion and squab in the leaning position.

A second embodiment is shown in FIG. 4. The second embodiment is of similar construction to the first embodiment and, in the drawings, like numerals are used to denote like parts. In the second embodiment, the pair of rotatable locking members 32 are replaced by pins 132 adapted to reciprocate within tubular mountings associated with the collars 27. A coil spring 136 is axially associated with each pin 132 to bias the pin 132 into a position adapted to engage a selected one of a plurality of apertures 139 formed in the inner side surface of the respective rearward tubular member 26. Each pin 132 is engaged with the rotatable actuating member 40 In a manner similar to that of the first embodiment by a line 38 which passes through a respective aperture 140 in the mounting plate 13. Thereby, the pin 132 is able it to be reciprocally disengaged from the rearward tubular member 26 by rotation of the rotatable actuating member 40, as previously described.

In use, the seat 11 may initially be presented in the normal manner having the cushion 12 relatively horizontal and the squab 16 back so that a user may comfortably sit upon the seat 11. When the user wishes to after the configuration so that he can be supported by the seat while he is standing, the locking means is released by rotating the actuating rod 40 and the cushion 12 rotated about the planar plate 21 so that the front edge is moved downwardly. While this is being done, the squab 16 is urged forward by the changing configuration of the tubular members 25 until the locking member 32 is locked into the leaning position. In this position the user obtains support while he is standing both frame the obliquely angled cushion 12 and from the forwardly displaced squab 16. This manner of operation provides support in a way that allows the user to stand but gives him lateral and rearward support when he is being thrown around in rocky conditions. By virtue of the plurality of apertures 37 (first embodiment) or aperture 139 (second embodiment), the user may optionally lock the squab and cushion In a position intermediate the first and second configurations. In this way, the user can also be given some vertical support from the cushion depending upon the relative positioning which is selected.

It should be appreciated that the scope of the present invention is not to be limited to the particular scope of the embodiments described above. For instance, those skilled In the art will recognize that alternative locking mechanisms and lock actuating mechanisms may be devised from those described with reference to the embodiments. All such variations and others are intended to be within the scope of the invention claimed.

Throughout the specification unless the context requires otherwise, the word "comprise" or variations such as "comprises" or "comprising", will be understood to imply the Inclusion of a stated integer or group of integers but not the exclusion of any other Integer or group of integers.

The invention claimed is:

1. A seat comprising
   a seat cushion and a squab, the squab having an angular orientation, the seat being adjustable between a first configuration, adapted to provide seating accommodation for a user, and a second configuration, adapted to provide leaning accommodation for a user;
   wherein, in the second configuration, the squab is positioned forwardly of the position it occupies when the seat is in said first configuration and the leaning accommodation is provided by both the squab and the seat cushion;
   wherein the seat supports the squab such that the angular orientation of the squab is substantially maintained during movement of the squab between the first and second configurations;
   wherein the seat cushion is pivotally supported from a base structure for pivotal movement, about the transverse axis, between a first position, which it occupies when the seat is in its first configuration, and a second position, which it occupies when the seat in is its second configuration; and
   wherein a linkage is provided between the base structure, the seat cushion and the squab, whereby pivotal movement of the seat cushion between the first and second positions is effected by corresponding movement of the squab, said linkage being in the form of a trapezoidal linkage.

2. A seat as claimed at claim 1 wherein the squab, when the seat is in its second configuration, is positioned substantially above the forward-most position of the seat cushion.

3. A seat as claimed at claim 1 wherein, when the seat is in its second configuration, the seat cushion is positioned obliquely and the forward-most portion of the seat cushion is at a lower height than the rear-most portion of the seat cushion.

4. A seat as claimed at claim 1 wherein a releasable locking mechanism is provided to retain the seat in at least one of the first configuration and the second configuration.

5. A seat as claimed at claim 4 wherein the releasable locking mechanism is further adapted to retain the seat in at least one selected position intermediate the first configuration and the second configuration.

6. A seat as claimed at claim 1, wherein the linkage is in the form of a parallelogram linkage.

7. A seat as claimed at claim 1, wherein the linkage comprises a set of members rotatably engaged with the squab and engaging the cushion to permit relative movement between the cushion and the squab during the pivotal movement of the cushion between its first and second positions.

8. A seat as claimed at claim 7 wherein each of the members of the linkage is slidably received by a collar engaged with the cushion.

9. A seat as claimed at claim 8 further including a releasable locking mechanism to retain the seat in at least one of the first configuration and the second configuration wherein the releasable locking mechanism is selectably engageable with the linkage.

10. A seat as claimed at claim 9, wherein each of the members of the linkage is slidably received by a collar engaged with the seat cushion and the releasable locking mechanism is associated with at least one of the collars.

11. A seat as claimed at claim 10 wherein the releasable locking mechanism comprises at least one reciprocally-actuated pin adapted to engage the linkage through a respective collar.

12. A seat as claimed at claim 11 wherein the locking mechanism comprises at least one rotatable member adapted to engage an aperture in the linkage.

13. A seat as claimed at claim 1 wherein the seat supports the squab such that the squab is moved substantially horizontally during movement of the squab between the first and second configurations.

14. A seat as claimed in claim 1, wherein the angular orientation of the squab is substantially vertical.

15. A seat comprising a seat cushion and a squab, the seat being adjustable between a first configuration, adapted to provide seating accommodation for a user, and a second configuration, adapted to provide leaning accommodation for a user;
    wherein, in the second configuration, the squab is positioned forwardly of the position it occupies when the seat is said first configuration;
    wherein the leaning accommodation is provided by both the squab and the seat cushion;
    wherein the seat cushion is pivotally supported from a base structure for pivotal movement, about a transverse axis, between a first position, which it occupies when the seat is in its first configuration, and a second position, which it occupies when the seat is in its second configuration;
    wherein a linkage is provided between the base structure, the seat cushion and the squab, whereby the pivotal movement of the seat cushion between the first and second positions is effected by corresponding movement of the squab, said linkage being in the form of a trapezoidal linkage;
    wherein the linkage comprises a set of members rotatably engaged with the squab and engaging the seat cushion to permit relative movement between the seat cushion and the squab during pivotal movement of the seat cushion between its first and second positions; and
    wherein each of the members of the linkage is slidingly received by a collar engaged with the seat cushion.

* * * * *